Nov. 12, 1929.   W. GAVETT   1,734,967
MECHANICAL REMOVAL OF SOLIDS FROM CLARIFICATION TANKS, ETC
Filed March 20, 1929   2 Sheets-Sheet 1
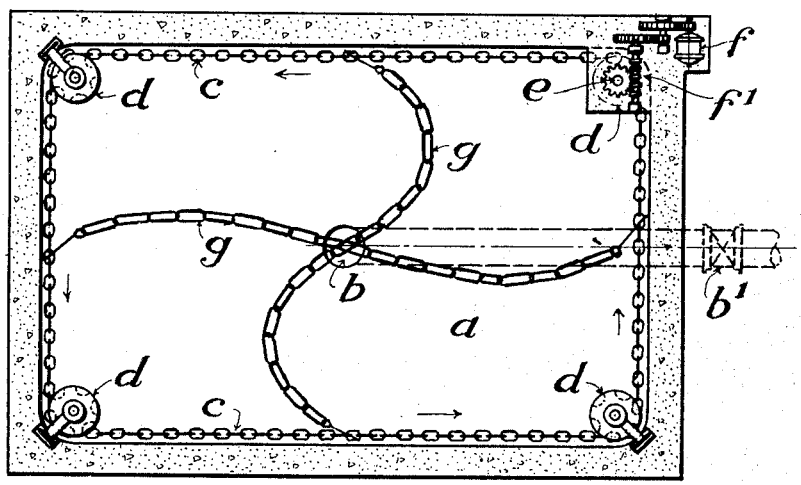
Fig.1
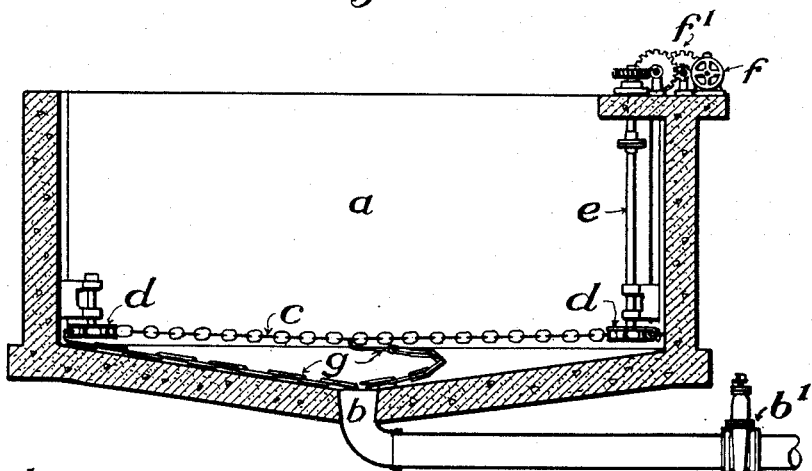
Fig.2
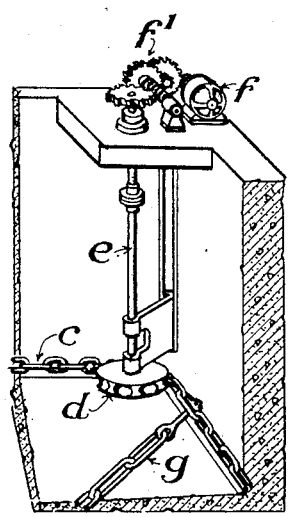
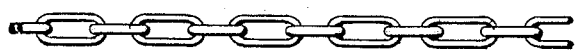
Fig.3
Fig.4
←Fig.5
INVENTOR.
Weston Gavett
BY
Redding, Greeley, O'Shea & Campbell
ATTORNEYS.

Patented Nov. 12, 1929

1,734,967

UNITED STATES PATENT OFFICE

WESTON GAVETT, OF PLAINFIELD, NEW JERSEY

MECHANICAL REMOVAL OF SOLIDS FROM CLARIFICATION TANKS, ETC.

Application filed March 20, 1929. Serial No. 348,441.

In the clarification of liquids, as in the treatment of water, sewage and trade waste, and in certain chemical and metallurgical processes, sedimentation in tanks is commonly practiced. In some cases the tanks are cleaned of sediment, after being emptied of the liquid, by washing the sediment into the outlet, with hand squeegeeing when the bottom of the tank is suited therefor. In other cases mechanical devices have been provided for the removal of the sediment and its discharge at the outlet or for stirring up the sediment and it is with such devices that the present invention is concerned. The object of the invention is to provide improved mechanical devices for such purposes which shall be more efficient and satisfactory in operation, shall be less dependent in effectiveness upon the shape of the tank and the character of the bottom, shall be less expensive to install, and shall be more readily operated. In accordance with the invention there is supported within the tank, at the periphery thereof, an endless travelling carrier to which at opposite points, are attached the ends of a flexible scraper. When motion is imparted to the carrier the flexible scraper, which is relatively slack, is moved over the bottom of the tank in opposite, reverse curves, moving the sediment to the outlet which is located at some point inside the perimeter and preferably, although not necessarily, at the center. The bottom of the tank may be a hopper bottom. The invention will be more fully explained hereinafter with reference to the accompanying drawings in which it is illustrated and in which:

Figure 1 is a top view, somewhat conventional, of a tank equipped with the invention, the outlet being located centrally.

Figure 2 is a view of the same in longitudinal sectional elevation.

Figure 3 is a detail view of a portion of the endless carrier.

Figure 4 is a detail view of a portion of one of the flexible scrapers.

Figure 5 is a detail view of the means for driving the endless carrier.

Figure 6:
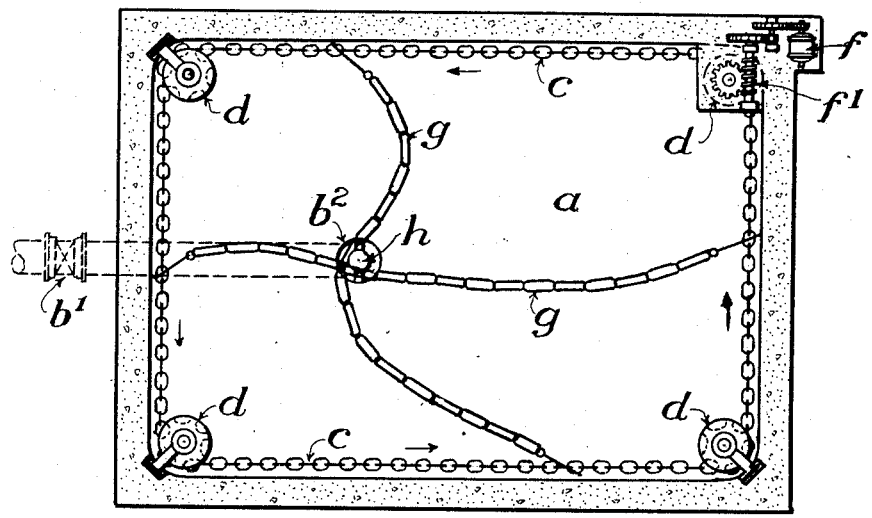
Figures 6 and 7 are views respectively similar to Figures 1 and 2 but illustrating the adaptation of the invention to a tank in which the outlet to the tank is not located centrally.
Figure 7:
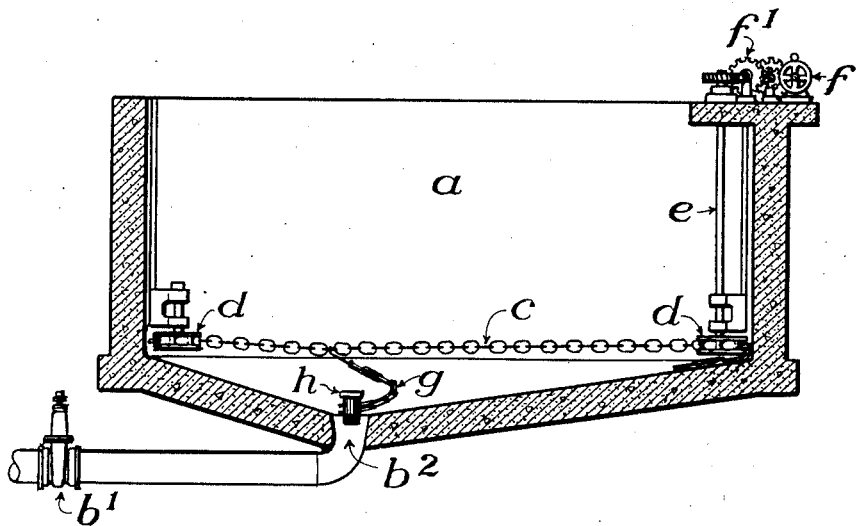

The tank $a$ may be of any desired shape. As shown conventionally in the drawings it is rectangular. In Figures 1 and 2 of the drawings the tank is shown as having a central outlet $b$, which may be provided with a controlling valve $b^1$. In Figures 6 and 7 the tank is shown as provided with an outlet $b^2$ nearer one end than the other. In all other respects the two embodiments of the invention illustrated are alike.

Supported within the tank $a$, at the perimeter thereof, is an endless travelling carrier $c$, preferably a chain. In the rectangular tank, such as that shown in the drawings, this drive chain or carrier is supported by pulleys $d$, one at each corner. Power may be applied to one or more of such pulleys for the driving of the carrier. As shown, one of the pulleys is carried by a shaft $e$ which is mounted in suitable bearings and may be driven from a motor $f$ through suitable gearing indicated at $f^1$. To opposite points of the carrier or drive chain $c$ are connected the two ends of a flexible scraper $g$, which may be a suitable chain as shown in Figure 4. The flexible scraper is somewhat slack, even when lengthwise of the tank, as shown in Figures 1 and 6, and as it moves over the bottom of the tank, on which it rests, it sweeps over the same in opposite, reverse curves, as shown in Figure 1. Preferably, two of such flexible scrapers are provided, as shown in Figure 1, and more might be used if conditions render them desirable.

When the outlet $b$ of the tank is centrally located, as shown in Figure 1, the solids are drawn by the flexible scraper or scrapers to the center of the tank and are discharged through the outlet, no guide for the scraper or scrapers being required. If, however, the outlet is not centrally located there should be placed at the outlet a guide post $h$, as shown in Figures 6 and 7, so that the scraper $g$, as its two ends move with the carrier $c$, shall be compelled to move about the post and so draw the solids to the outlet. It will be understood that the scraper is not connected to the guide post in any manner but moves about the same freely, the post forming a bearing for the scraper.

While the invention has been illustrated herein as applied to a rectangular tank with a hopper bottom and with a flexible scraper resting directly on such hopper bottom and driven by means described, it will be understood that various changes in details of construction and arrangement can be made to suit different conditions of use and that, except as pointed out in the accompanying claim, the invention is not restricted to the particular constructions shown and described herein.

I claim as my invention:

The combination with a tank having an outlet, a carrier mounted within the tank, a flexible scraper having its ends connected with the carrier at opposite points, and a guide post at the outlet and forming a bearing for the scraper.

This specification signed this 25th day of February, A. D. 1929.

WESTON GAVETT.